United States Patent [19]
Shimo et al.

[11] Patent Number: 5,432,779
[45] Date of Patent: Jul. 11, 1995

[54] TIME DIVISION MULTIPLEX TRANSMITTING/RECEIVING SYSTEM

[75] Inventors: Norio Shimo, Kanagawa; Hideaki Sato, Saitama; Sei Suzuki, Tokyo; Hisaki Hiraiwa, Kanagawa, all of Japan

[73] Assignee: Sony Corporation, Tokyo, Japan

[21] Appl. No.: 223,573

[22] Filed: Apr. 6, 1994

[30] Foreign Application Priority Data

Apr. 9, 1993 [JP] Japan .................. 5-082276

[51] Int. Cl.6 .................. H04B 1/50; H04B 7/212
[52] U.S. Cl. .................. 370/30; 370/50; 370/95.3; 455/85; 455/86
[58] Field of Search .................. 455/84, 85, 86, 87; 375/8, 27, 30; 370/24, 29, 30, 39, 50, 95.1, 95.3

[56] References Cited

U.S. PATENT DOCUMENTS

| | | | |
|---|---|---|---|
| 4,525,835 | 6/1985 | Vance et al. | 455/86 |
| 5,134,615 | 7/1992 | Freeburg et al. | 370/95.3 |
| 5,307,378 | 4/1994 | Norimatsu | 455/87 |

Primary Examiner—Benedict V. Safourek
Attorney, Agent, or Firm—Limbach & Limbach; Philip M. Shaw

[57] ABSTRACT

A time division multiplex transmitting/receiving system converts a signal to be transmitted into a signal having a predetermined frequency in a predetermined time slot, which is transmitted as a transmission signal, and receives a transmitted signal having a frequency different from the frequency of the transmitted signal at another time slot different from the time slot of the predetermined frequency, and for demodulating this received signal. The time division multiplex transmitting/receiving system includes a fixed oscillator, a variable oscillator, a mixer, a modulator, a converter, a frequency divider, and a demodulator. The fixed oscillator outputs a first signal having a constant frequency. The variable oscillator outputs a second signal having a predetermined frequency within a predetermined band range. The mixer mixes the first signal with the second signal. The modulator directly modulates a signal to be transmitted by employing the mixed signal. The converter converts the received signal into the intermediate signal by employing the mixed signal. The frequency divider frequency-divides the first signal outputted from the fixed oscillator. The demodulator demodulates the intermediate frequency signal outputted from the converter with using the output from the frequency divider.

12 Claims, 14 Drawing Sheets

4XF

2XF (2XF)'

F

F'

TIME DIVISION MULTIPLEX TRANSMITTING/RECEIVING SYSTEM

BACKGROUND OF THE INVENTION

1. Field of the Invention

The present invention generally relates to a time division multiplex transmitting/receiving system. More specifically, the present invention is directed to a time division multiplex transmitting/receiving system in which the transmitting frequency thereof is different from the receiving frequency thereof, and the transmission and the signal reception are switched for every predetermined time slot.

2. Description of Prior Art

In the GSM (Group Special Mobile) corresponding to the digital cellular system in Europe, as shown in FIG. 1, a service area is subdivided into a plurality of regions "Ra" to "Re". To the respective subdivided service regions, exclusive-use frequencies "fa" to "fe" are allocated as frequencies of transmission/reception signals. These exclusive-use frequencies are: determined in such a manner that the frequencies of the adjoining regions must be separated from each other as much as possible.

As shown in FIG. 2(a), the frequencies "fa" to "fe" are constituted by the transmission frequencies and the reception frequencies, and as the transmission (TX) frequencies, the frequency band of a range from 890 MHz to 915 MHz is employed. This frequency band is subdivided into 125 channels (CH) with a bandwidth of 200 KHz respectively. As shown in FIG. 2(b), the reception (RX) frequencies are set to a frequency range from 935 MHz to 960 MHz. This frequency band is also subdivided into 125 channels with a bandwidth of 200 KHz, respectively.

The GSM utilizes a so-called "frequency hopping" to establish a privacy function. That is, the respective channels are segmented into frames for every predetermined time along the time axial direction, 4.616 ms in the GSM. Considering a single mobile station, the channel (frequencies) used by this mobile station is changed for every frame. It should be noted that the transmission/reception channels (frequencies) are selected in such a manner that a difference between the transmission channel frequency and the reception channel frequency is continuously 45 MHz.

Each of the frames is subdivided into 8 time slots (namely, a single time slot being 0.577 ms), as illustrated in FIG. 3. Among these 8 time slots, a preselected one time slot (namely, the head slot in the example of FIG. 3) is determined as a reception (RX) time slot. Only a time slot subsequent to this reception (RX) time slot by 3 time slots is used as a transmission (TX) time slot. A time slot succeeding to this transmission-(TX) time slot by either two, or three time slots is used as a monitoring (MON) time slot. In this monitor (MON) time slot, a strength of an electric field of a signal transmitted from the adjoining base station is monitored. When the field strength of the reception signal from the adjoining base station becomes higher than a predetermined field strength, the reception channel is switched to this adjoining base station. It should be noted that although the transmission (TX) time slot is synchronized with the reception (RX) time slot, the monitor (MON) time slot is not always synchronized with these transmission (TX) and reception (RX) time slots. The channels to be monitored are changed for each frame. As a result of channel monitoring, empty channels with better reception conditions are properly selected, and then utilized as the transmission and reception time slots time sequentially succeeded to the empty channels.

FIG. 4 represents a terminal unit employed in such a GSM, namely one example of an arrangement of a transmitting/receiving apparatus mounted on an automobile, or portable by an operator. As shown in FIG. 4, this apparatus includes an RF (radio frequency) unit 1 connected to an antenna, and a baseband process unit 2. The RF unit 1 is coupled with the baseband process unit by way of A/D converters 3a, 3b and D/A converters 4a, 4b.

A signal received by the antenna 11 is separated from a transmission system (i.e., system constructed of blocks having reference numerals of a series of 30 shown in FIG. 4) by a duplexer 12 and outputted to a reception system (i.e., system constructed of blocks having reference numerals of a series of 10 and 20). An RF (radio frequency) low-noise amplifier 13 is positioned at a front end of the reception system to amplify this reception signal. The output of this RF low-noise amplifier 13 is inputted into a reception channel band-pass filter 14. As previously explained, the frequency bandwidth of the reception signal are 936 MHz to 960 MHz. The reception channel band-pass filter 14 separates the frequency component of the presently selected predetermined reception channel, and then outputs the separated frequency component to a first-stage reception mixer 15.

An oscillator 41 outputs a signal (carrier) having a frequency corresponding to either the reception channel, or the transmission channel in the range from 1006 MHz to 1031 MHz. The frequency of the signal outputted from this oscillator 41 is controlled in such a manner that this output frequency becomes higher than the frequency of the reception channel signal by 71 MHz. Since the first-stage reception mixer 15 mixes (multiplies) the reception signal supplied from the reception channel band-pass filter 14 with the signal outputted from the oscillator 41, an output from this mixer 15 contains a frequency component of 71 MHz corresponding to a difference between the frequencies of both these input signals. In other words, the reception signal is converted into a first intermediate frequency signal having a frequency of 71 MHz.

A first-stage intermediate frequency filter 16 separates this first intermediate frequency signal of 71 MHz from the output signal of the first-stage reception mixer 15. A first-stage intermediate frequency amplifier 17 amplifies this separated signal and supplies the amplified signal to a second-stage reception mixer 18. An oscillator 42 supplies a signal having a frequency of 65 MHz to the second-stage reception mixer 18. Since the second-stage reception mixer 18 mixes (multiplies) the first intermediate frequency signal of 71 MHz supplied from the first-stage intermediate frequency amplifier 17 with the signal having the frequency of 65 MHz outputted by the oscillator 42, the first intermediate frequency signal having the frequency of 71 MHz is converted into the second intermediate frequency signal having the frequency of 6 MHz.

The second intermediate frequency filter 19 separates this second intermediate frequency signal having the frequency of 6 MHz and supplies the separated signal to a second-stage intermediate frequency AGC amplifier 20. The second-stage intermediate frequency AGC amplifier 20 controls the gain of this second intermediate frequency signal in response to a control signal supplied from the baseband process unit 2 and supplies the gain-controlled second intermediate frequency signal to a quadrature demodulator 21. The quadrature demodulator 21 quadrature-demodulates the second intermediate frequency signal supplied from the second-stage intermediate frequency AGC amplifier 20 with employment of a reference signal having a frequency of 6 MHz outputted by an oscillator 44, thereby outputting an I-component signal and a Q-component signal. The I-component signal and the Q-component signal are A/D-converted by the A/D converters 3a and 3b, respectively, and the A/D-converted signals are supplied to the baseband process unit 2. The baseband process unit 2 processes the I-component signal and the Q-component signal to reproduce the original signal, i.e., the voice (audio) signal which will then be supplied to a speaker or the like (not shown).

On the other hand, when a signal is to be transmitted is, a voice (audio) signal inputted from a microphone (not shown) is processed by the baseband process unit 2 to produce the processed signal to be transmitted. An I-component signal and a Q-component signal in this processed signal are D/A-converted by the D/A converters 4a and 4b and the D/A-converted signals are inputted into a quadrature modulator 31. The quadrature modulator 31 quadrature-modulates these I-component signal and Q-component signal with using a signal having a frequency of 116 MHz outputted by an oscillator 43. Signal components of the signal derived from the quadrature modulator 31 other than the signal component having the frequency of 116 MHz are removed by a transmission intermediate frequency filter 32, and then are amplified by a transmission intermediate frequency amplifier 33. Thereafter, the amplified signal is inputted into a transmission mixer 34.

To this transmission mixer 34, the same signal as that supplied to the first-stage reception mixer 15 in the signal reception system is supplied from the oscillator 41. As previously described, the frequency of this signal is selected to be higher than the frequency of the reception signal by 71 MHz. The frequency of 116 MHz for the signal inputted from the quadrature modulator 31 into the transmission mixer 34 is selected to be higher than the frequency of 71 MHz for the first intermediate frequency signal outputted from the first-stage reception mixer 15 by 45 MHz. As a consequence, the frequency of the transmission signal derived from the transmission mixer 34 which mixes the signal having the frequency of 116 MHz supplied from the transmission intermediate frequency amplifier 33 with the signal supplied from the oscillator 41, contains a lower frequency component than the frequency component of the reception signal inputted into the first-stage reception mixer 15 by 45 MHz.

A transmission channel band-pass filter 35 separates from the signal outputted from the transmission mixer 34, only a component corresponding to the transmission channel frequency band, i.e., the frequency component lower than that of the reception channel by 45 MHz, thereby outputting the separated signal component to a power amplifier 36. The power amplifier 36 power-amplifies the inputted signal and then supplies the power-amplified signal to the duplexer 12 via an isolator 37. The duplexer 12 transmits the inputted signal through the antenna as the electromagnetic wave.

FIG. 5 represents a frequency relationship of the signals inputted/outputted into/from the respective circuit blocks within the apparatus shown in FIG. 4. As shown in FIG. 5, the oscillator 41 is a variable frequency oscillator for producing a signal having a predetermined frequency which is varied from 1,006 MHz to 1,031 MHz at a step of 200 KHz. The oscillators 42 to 44 correspond to fixed frequency oscillators for producing a signal having a constant frequency of 65 MHz, 116 MHz, or 6 MHz.

These oscillators 41 to 44 employed in the RF unit 1 are arranged by a so-called "PLL synthesizer", namely by a voltage controlled oscillator (VCO), a low-pass filter, a phase comparator, and a frequency divider.

FIGS. 6(a) and 6(b) indicate variations in the frequencies of the signals outputted from the oscillator 41. As represented in FIGS. 6(a) and 6(b), the oscillating frequency of the oscillator 41 is set to a frequency "$f_1$" corresponding to the reception channel (transmission channel) in the reception (RX) slot within the frame. Since the oscillating frequency is also used in the transmission (TX) time slot succeeding to the reception (RX) time slot by 3 time slots, the frequency of the oscillator 41 is fixed until this time. Then, after the transmission (TX) time slot is ended, this frequency of the oscillator 41 is set to a frequency "$f_2$" corresponding to the reception channel to be monitored in another time slot to be monitored.

That is to say, after the transmission time slot is completed, the oscillator 41 starts its scanning operation to thereby change the oscillating frequency from "$f_1$" into "$f_2$". Then, after the monitoring operation is ended, the oscillator 41 restarts its scanning operation, so that the oscillating frequency of "$f_2$" is changed into another frequency "$f_3$" corresponding to the reception channel in the reception time slot within the subsequent frame. As previously explained, the oscillator 41 scans its oscillating frequency at a high speed during a time period from approximately 0.5 ms to 1 ms.

According to the GSM recommendation, the interference characteristic of adjoining channels (C/I ratio) in the signal reception system is defined as represented in FIG. 7. In other words, the C/I ratio of $-9$ dB is required for an adjoining channel separated from the desirable channel of 200 KHz (i.e., 1 channel); the C/I ratio of $-41$ dB is required for another adjoining channel separated from the desirable channel by 400 KHz (=2 channels); and furthermore the C/I ratio of $-49$ dB is required for another adjoining channel separated from the desirable channel by 600 KHz (=3 channels). Even when the levels of the interference waves are higher than the levels of the desirable waves, the desirable waves must be received.

As a consequence, when all of the RI unit 1 would be arranged by analog signal systems, even if both the desirable waves and the interference waves could be received at the same levels, the band limit of $-9$ dB is required for the frequency separated from the desirable wave by 200 KHz, the band limit of $-41$ dB is required for the frequency separated from the desirable wave by 400 KHz, and the band limit of $-49$ dB is required for the frequency separated from the desirable wave by 600 KHz at the stages of the intermediate frequencies. As a result, in the apparatus shown in FIG. 4, an SAW filter is employed as the first-stage intermediate frequency filter 16 for separating the first intermediate frequency signal having 7 MHz. A ceramic filter is employed as the second-stage intermediate filter 19 for separating the frequency of 6 MHz.

To improve portability of the GSM terminal unit, this terminal unit should be made compact and light weight as permitted as possible, and also low power consumption should be achieved. As a result of great improvements in the recent digital signal processing techniques and the recent very large scaled digital IC technology, the baseband process unit 2 could be made compact and powered under low consumption. Although the RF unit 1 would be manufactured by IC and made compact under low power consumption, since this RF unit 1 employs the oscillators and the filters, these circuit components are relatively difficult to be made by IC. Also it is a practical reason that as these filters and oscillators employ such components for requiring adjustments, they are not easily made compact and operated under low power consumption, As a consequence, it is desirable for the RI unit 1 that, for instance, the total number of the stages for the intermediate frequency signal processing, and also the quantities of local oscillators and filters would be lowered in order to improve compactness and lower power consumption thereof.

Then, it would be conceivable that for instance, the apparatuses shown in FIG. 4 and FIG. 5 are constructed by a structure as represented in FIG. 8. In this apparatus of FIG. 8, the signal to be supplied to the first-stage reception mixer 15 is directly supplied to the quadrature modulator 31 so as to directly modulate the signal to be transmitted. In this case, it is assumed that the frequency of the signal outputted from the oscillator 41 is selected to be from 864 MHz to 889 MHZ in the reception (RX) time slot, whereas it is selected to be from 890 MHz to 915 MHz in the transmission (TX) time slot. In this case, since the intermediate frequency signal of 116 MHz is no longer required in the signal transmission system, the oscillator 43 is not required. As a result, the entire arrangement of this apparatus could be made simpler.

However, since the oscillating frequency of the signal derived from the oscillator 41 is identical to the frequency of the transmission signal outputted from the quadrature modulator 31, the oscillating operation of the oscillator 41 is swung by the carrier of this transmission signal, so that this oscillating operation would become unstable.

To avoid this difficulty, it would also be conceivable to arrange this apparatus in a manner shown in FIG. 9. In this alternative structure of FIG. 9, the circuit arrangement of the transmission system is constructed similar to that of FIG. 5, whereas the circuit arrangement of the reception system is constructed different from that of FIG. 5. That is, the intermediate frequency signal having the frequency of 71 MHz produced from the first-stage reception mixer 15 is not converted into the second intermediate frequency signal having the frequency of 6 MHz, but is directly supplied into the quadrature demodulator 21. As a consequence, the frequency of the signal supplied from the oscillator 44 into the quadrature demodulator 21 is also selected to be 7 MHz. After an I signal component and a Q signal component, which are outputted from the quadrature demodulator 21 are modulated by sigma/delta modulators 61a and 61b, respectively, only signal components having predetermined frequency bands are separated by digital filters 62a and 62b, which will then be supplied to the baseband process unit 2.

With such a circuit arrangement, since the second intermediate frequency signal having the frequency of 6 MHz in the reception system is no longer required, the oscillator 44 is not necessary.

However, three oscillators are still required in this example.

SUMMARY OF THE INVENTION

It is, therefore, an object of the present invention to provide a time division multiplex transmitting/receiving system capable of solving the above-described problems of the conventional time division multiplex transmitting/receiving system.

According to one aspect of the present invention, there is provided a time division multiplex transmitting/receiving system for converting a signal to be transmitted into a signal having a predetermined frequency in a predetermined time slot, which is transmitted, and for receiving a transmitted signal having a frequency different from the frequency of the transmitted signal in another time slot different from the time slot of said predetermined frequency, and for demodulating this received signal. The time division multiplex transmitting/receiving system includes a fixed oscillator, a variable oscillator, a mixer, a modulator, a converter, a frequency divider, and a demodulator. The fixed oscillator outputs a first signal having a constant frequency. The variable oscillator outputs a second signal having a predetermined frequency within a predetermined band range. The mixer mixes the first signal with the second signal. The modulator directly modulates a signal to be transmitted by employing the mixed signal. The converter converts the received signal into the intermediate signal by employing the mixed signal. The frequency divider frequency-divides the first signal outputted from the fixed oscillator. The demodulator demodulates the intermediate frequency signal outputted from the converter using the output from the frequency divider.

According to another aspect of the present invention, there is provided a time division multiplex transmitting/receiving system for converting a signal to be transmitted into a signal having a predetermined frequency in a predetermined time slot, which is transmitted, and for receiving a transmitted signal having a frequency different from the frequency of the transmitted signal in another time slot different from the time slot of said predetermined frequency, and for demodulating this received signal. This time division multiplex transmitting/receiving system includes a single antenna, an RF unit, an A/D converter, a signal process unit and a D/A converter. The RF unit is connected to the antenna. The RF unit contains an oscillator unit, a modulator, a converter and a demodulator. The oscillator unit outputs a signal produced by mixing a first signal having a constant frequency, and a second signal having a frequency fitted to the transmission and reception within a predetermined frequency range with the first signal. The modulator directly modulates a signal to be transmitted based on the mixed signal outputted from the oscillator unit. The converter converts the received signal into the intermediate frequency signal by utilizing the signal outputted from the oscillating unit. The demodulator demodulates the intermediate frequency signal based on a signal obtained by frequency-dividing the first signal. The A/D converter receives the output signal from the demodulator. The output signal from the A/D converter is supplied to the signal process unit which converts the output signal from the A/D converter into a voice signal, and converts an inputted voice signal into a signal to be transmitted. The D/A converter D/A-converts the signal to be transmitted which is outputted from the signal process unit into a corresponding analog signal. This analog signal is outputted into the modulator.

In accordance with the present invention, the modulator directly modulates the signal to be transmitted by employing the signal obtained by mixing the first signal with the second signal. After the received signal has been converted into the intermediate frequency signal by employing the mixed signal, the intermediate frequency signal is demodulated by using the frequency divided first signal, so that a total number of oscillators can be reduced, and also the time division multiplex transmitting/receiving system can be made compact and operated under low power consumption. Furthermore, according to the present invention, it is possible to suppress that the oscillating operation of the variable oscillator is caused to be unstable in response to the output of the modulator.

BRIEF DESCRIPTION OF THE DRAWINGS

For a better understanding of the present invention, reference is made of the detailed description to be read in conjunction with the accompanying drawings, in which:

FIGS. 17(a) to FIG. 17(e) are timing charts to explain operations of the frequency dividing circuit 93 shown in FIG. 16, wherein FIG. 17(a) is a waveform chart for showing an output signal derived from the frequency dividing circuit; FIG. 17(b) is a waveform chart of a signal inputted into the clock terminal CK of the D type flip-flop 102; FIG. 17(c) is a waveform chart for indicating an IQ signal of the D type flip-flop 101; FIG. 17(d) is a waveform chart for representing a Q output of the D type flip-flop 102; and FIG. 17(e) is a waveform chart for indicating a Q output of the D type flip-flop 103.

DETAILED DESCRIPTION OF THE PREFERRED EMBODIMENTS

Referring now to drawings, a time division multiplex transmitting/receiving system according to the present invention will be described in detail.

Figure 4:
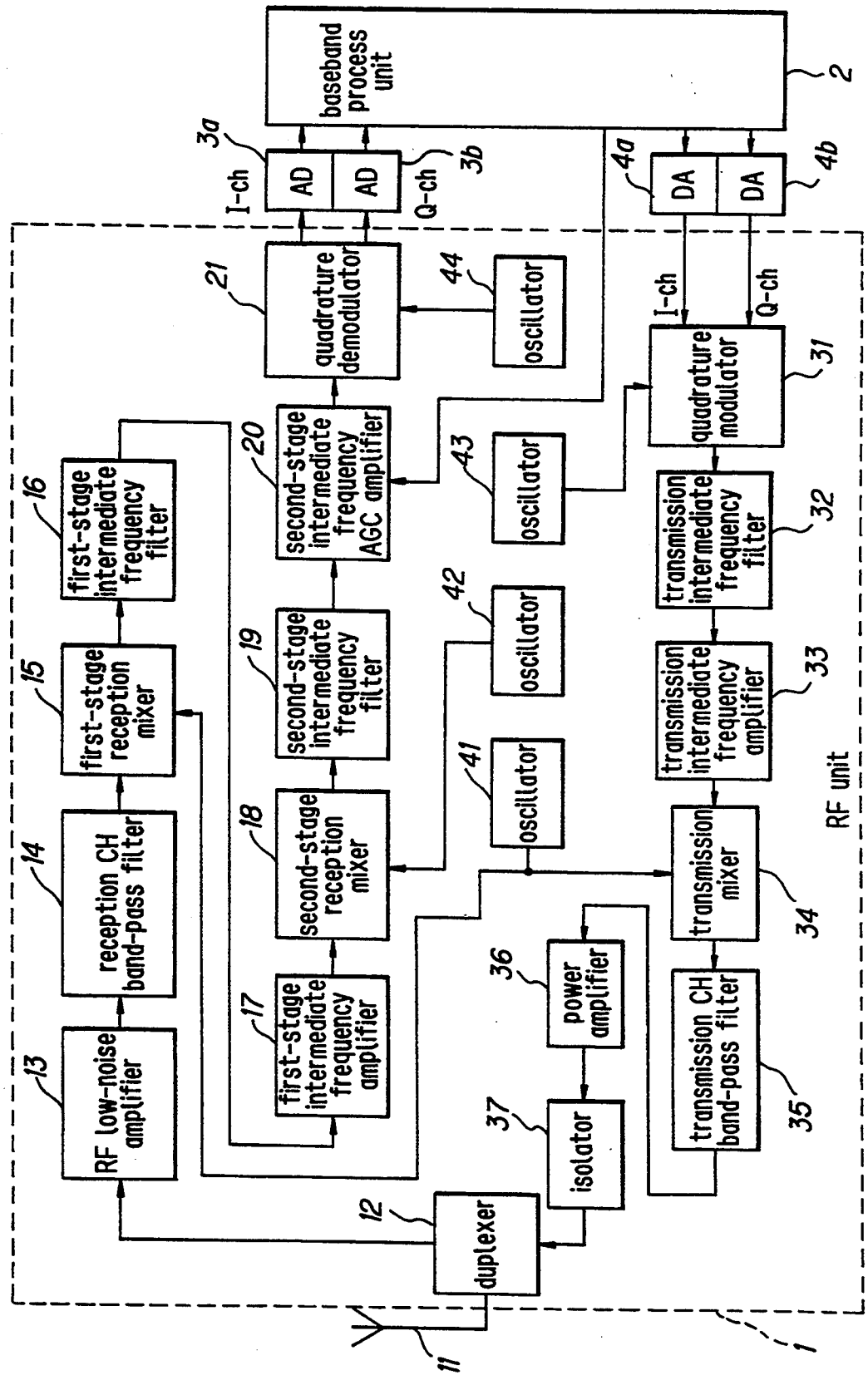
FIG. 4 is a schematic block diagram for showing the arrangement of the terminal unit in the digital cellular system functioning an a base of the present invention.
Figure 9:
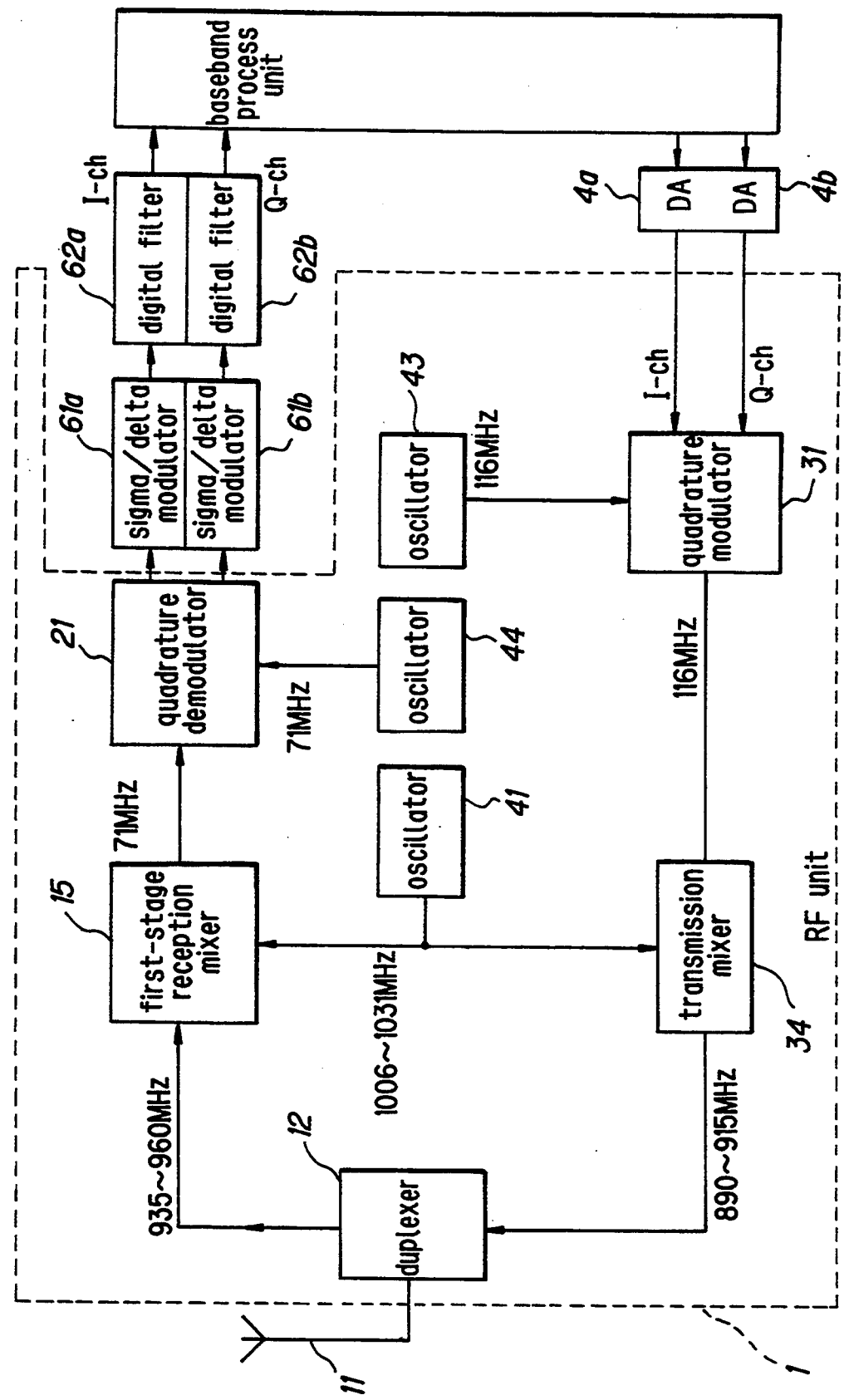
FIG. 9 is a schematic block diagram for representing a further arrangement of the terminal unit functioning as a base of the present invention.
Figure 10:
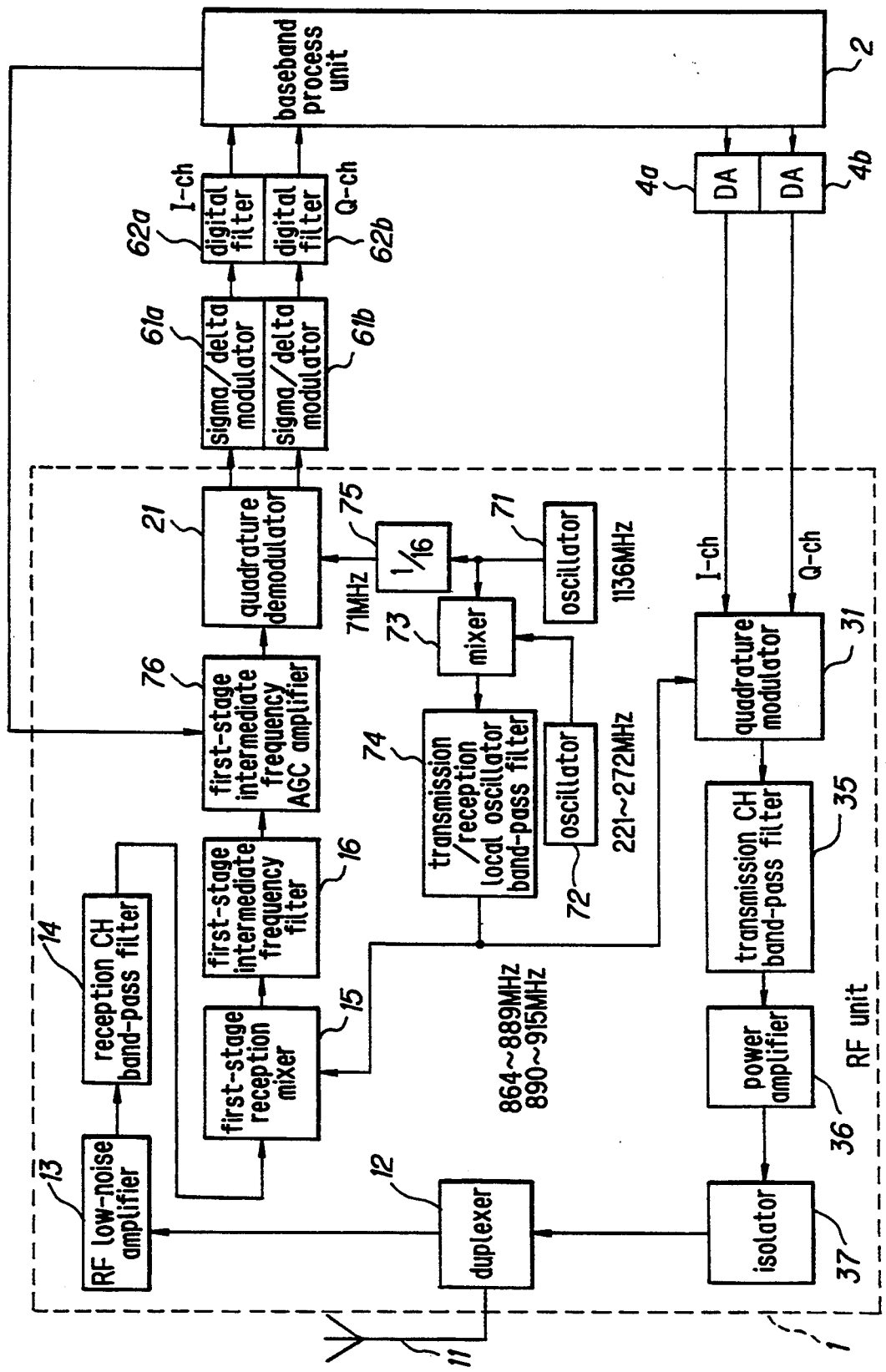
FIG. 10 is a schematic block diagram for indicating an arrangement of a time division multiplex transmitting/receiving system according to a first embodiment of the present invention.

FIG. 10 schematically shows an arrangement of a GSM (group special mobile) terminal unit to which the time division multiplex transmitting/receiving system according to the present invention is applied. It should be noted that the same reference numerals employed in the transmitting/receiving systems of FIG. 4 and FIG. 9 will be used as those for showing the same or similar circuit elements in FIG. 10. In this first embodiment, an I signal component and a Q signal component, which are outputted from a baseband process unit 2, are entered via D/A converters 4a and 4b into an RF unit 1 in a similar manner to that of FIG. 9. Also, both the I signal component and the Q signal component, outputted from the RI unit 1, are supplied via digital filters 62a and 62b to the baseband process unit 2.

An output of a quadrature modulator 31 is furnished via a transmission channel band-pass filter 35, a power amplifier 36, and an isolator 37 to a duplexer 12. Furthermore, an output from the duplexer 12 is supplied via an RF (radio frequency) low-noise amplifier 13, and a reception channel band-pass filter 14 to a first-stage reception mixer 15. An output derived from the first-stage reception mixer 15 is supplied via a first-stage intermediate frequency filter 16, and a first-stage intermediate frequency AGC amplifier 76 to a quadrature demodulator 21.

A signal (carrier) having a frequency of 1,136 MHz outputted from an oscillator 71 is supplied to a mixer 73. In the mixer 73, the signal having the frequency of 1,136 MHz is mixed (multiplied) by a signal having a frequency from 221 MHz to 272 MHz and outputted from the oscillator 72, and the resultant mixed signal is supplied via a transmission/reception local oscillator bandpass filter 74 to a quadrature modulator 31 and a first-stage reception mixer 15. The oscillator signal from the oscillator 71 is frequency-divided into a signal having a 1/16 frequency lower than the frequency of the oscillator signal by a frequency dividing circuit 75 and thereafter the frequency-divided signal is supplied to a quadrature demodulator 21.

Figure 11:
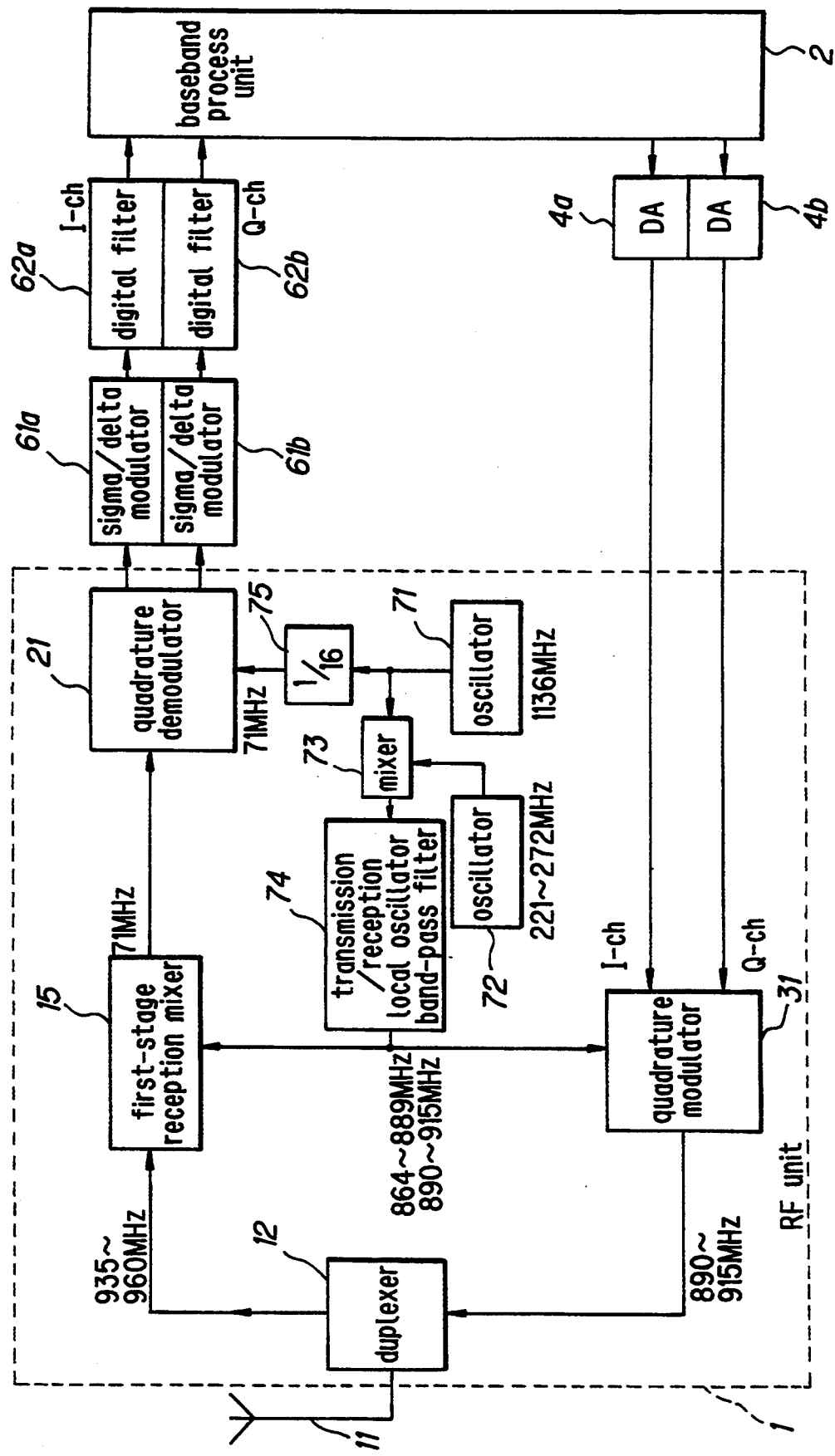
FIG. 11 is a schematic block diagram for showing an arrangement of the relevant circuit in the time division multiplex transmitting/receiving system of FIG. 10 to explain a relationship among the frequencies in the respective circuit portions.

FIG. 11 represents the circuit arrangement of FIG. 10 and frequency values at the various circuit portions within this circuit arrangement.

Operations of the time division multiplex transmitting/receiving system according to the first embodiment of the present invention will now be explained. In the reception time slot, the duplexer 12 outputs the reception signal received by the antenna 11 via the RF low-noise amplifier 13 to the reception channel band-pass filter 14. The reception channel band-pass filter 14 extracts only the signal having the frequency band corresponding to the reception channel among the inputted signals and outputs this extracted signal to the first-stage reception mixer 15.

The oscillator 72 outputs the signal having the frequency corresponding to the frequency of the signal in the received channel among the frequencies from 247 MHz to 272 MHz. This output signal is mixed with the signal having the frequency of 1,136 MHz produced from the oscillator 71 in the mixer 73. As a result, the signal outputted from the mixer 73 contains the components of the frequency band from 864 MHz to 889 MHz. The transmission/reception local oscillator band-pass filter 74 extracts only the component corresponding to the frequency of the signal in the received channel among the signals of this frequency band, namely only the frequency component lower than the frequency of the reception signal by 71 MHz, which will then be outputted to the first-stage reception mixer 15.

Figure 1:
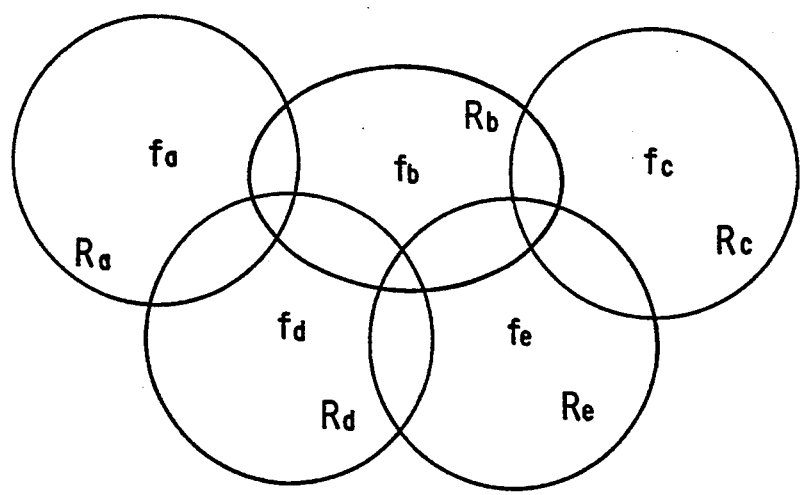
FIG. 1 is an explanatory diagram for explaining a relationship between regions and frequencies in the digital cellular system.
Figure 2:
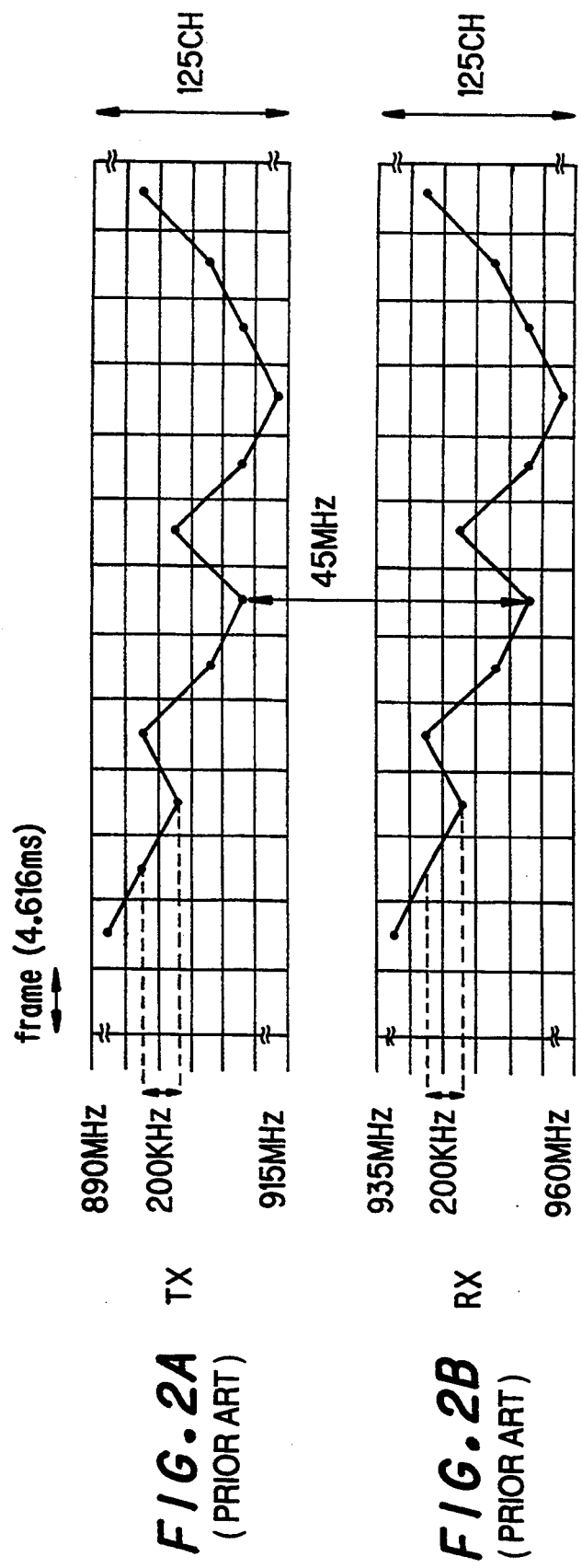
FIGS. 2(a) is an explanatory diagram for showing the frequency band in the transmission channel in the digital cellular system and FIG. 2(b) is an explanatory diagram for explaining the frequency band in the reception channel in this digital cellular system.
Figure 3:
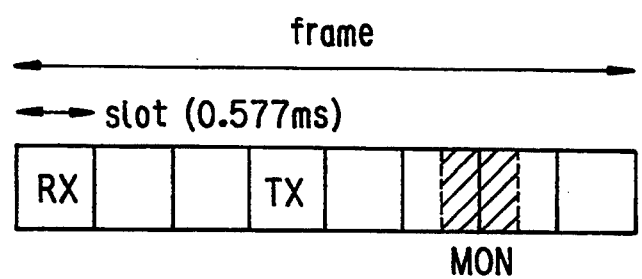
FIG. 3 is an explanatory diagram for explaining a relationship between the frame and the time slot in the digital cellular system of FIG. 2.

The first-stage reception mixer 15 mixes (multiply) the signal corresponding to the signal in the received channel and supplied from the reception channel band-pass filter 14 with the signal outputted from the transmission/reception local oscillator band-pass filter 74 to convert the reception signal into the intermediate frequency signal having the frequency of 71 MHz. It should be noted that as previously described in FIG. 2, the signal supplied from the reception channel band-pass filter 14 has a frequency having a band from 935 MHz to 960 MHz. After the unwanted frequency band components have been removed from this intermediate frequency signal by the first-stage intermediate frequency filter 16, the filtered intermediate frequency signal is inputted into the first-stage intermediate frequency AGC amplifier 76, so that the gain of this filtered signal is adjusted to a predetermined gain. A gain control signal is supplied from the baseband process unit 2 to the first-stage intermediate frequency AGC amplifier 76. The signal outputted from the first-stage intermediate frequency AGC amplifier 76 is supplied to the quadrature demodulator 21. In this first-stage intermediate frequency AGC amplifier 76, the gain of the intermediate frequency signal is controlled in such a manner that this gain is coincident with a dynamic range of sigma/delta modulator in order to be A/D-converted under better conditions by the sigma/delta modulator at the post stage.

Also, to this quadrature demodulator 21, a signal having a frequency of 71 MHz, i.e., a carrier is entered which is produced by frequency-dividing the signal having the frequency of 1,136 MHz and produced from the oscillator 71 by 1/16 in the frequency dividing circuit 75. The quadrature demodulator 21 quadrature-demodulates the signal supplied from the first-stage intermediate frequency AGC amplifier 76 by utilizing this carrier. Both the I signal component and the Q signal component, which are outputted from the quadrature demodulator 21, are modulated by the sigma/delta modulators 61a and 61b, respectively. Thereafter, the unnecessary frequency band components are eliminated from the modulated signal components by digital filters 62a and 62b, and the resulting signal components are furnished to the baseband process unit 2.

The sigma/delta modulators 61a and 61b function as oversampling A/D converters. When the input signals are A/D-converted by the sigma/delta modulators 61a and 61b, the spectrum of quantized noise is spread over a wider frequency band. That is, so-called "noise shaping" can be performed. Then, the quantized noise components are removed from such a signal whose quantized noise components have been spread over the wider frequency band by the digital filters 62a and 62b functioning as decimation filters, whereby only desired frequency band components are extracted.

As described above, these sigma/delta modulators 61a and 61b are combined with the digital filters 62a and 62b so as to sufficiently suppress the interference waves whose levels are higher than those of the desired waves, so that only the desired waves can be extracted.

During signal transmission, an I signal component and a Q signal component, which are outputted from the baseband process unit 2, functioning as a signal to be transmitted, are D/A-converted by the D/A converters 4a and 4b, and the resultant signal components are inputted into the quadrature modulator 31 at a transmission time slot. The oscillator 72 produces a signal having a frequency corresponding to the transmitting channel within the frequency band from 221 MHz to 246 MHz at the transmission time slot. In the mixer 73, the signal from the oscillator 72 is mixed with the signal having the frequency of 1,136 MHz outputted from the oscillator 71, so that the frequency of the signal outputted from the mixer 73 contains the frequency corresponding the transmitting channel among the frequency band from 890 MHz to 915 MHz. The transmission/reception local oscillator band-pass filter 74 extracts only the frequency components corresponding to the transmission channel and supplies the extracted signal to the quadrature modulator 31.

The quadrature modulator 31 quadrature-modulates the I signal component and the Q signal component, which are entered from the D/A converters 4a and 4b with employment of the signal supplied from the transmission/reception local oscillator band-pass filter 74, and outputs the quadrature-modulated signal component to the transmission channel band-pass filter 35. The transmission channel band-pass filter 35 extracts only the signal components corresponding to the transmitting channel from the signal outputted from the quadrature modulator 31, and supplies the extracted signal component to the power amplifier 36. The signal power-amplified by the power amplifier 36 is supplied via the isolator 37 to the duplexer 12, and further emitted as electromagnetic waves through the antenna 11.

Figure 12A:
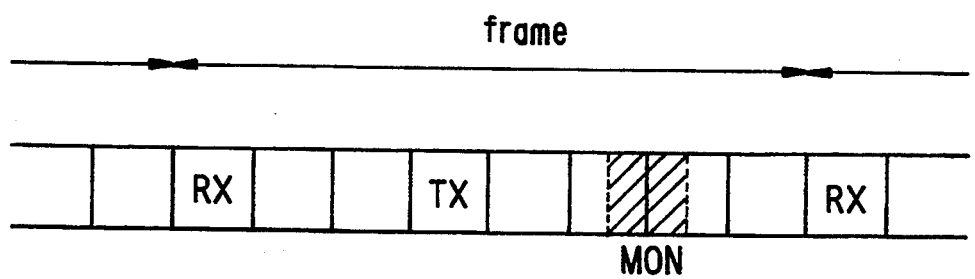
FIG. 12(a) is a timing chart for showing a frame and time slots to explain operations of the first embodiment and FIG. 12(b) is a timing chart for indicating variations in oscillating frequencies of the oscillators to explain operations of the first embodiment.
Figure 12B:
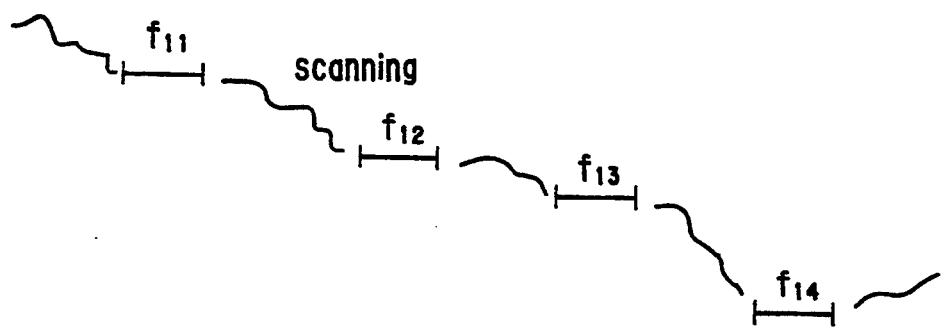

FIGS. 12(a) and 12(b) illustrate variations in the oscillating frequencies of the oscillator 72. As shown in FIG. 12(a) and 12(b), at the reception (RX) time slot within a predetermined frame, the frequency of the signal outputted from the oscillator 72 is set to the frequency "$f_{11}$" corresponding to the receiving channel. In this first embodiment, the oscillator 72 oscillates the signals with the different frequencies during the signal transmission and the signal reception. As a consequence, when one reception time slot is ended, the oscillating frequency is scanned while the subsequent transmission (TX) time slot arrives, and then the signal having the frequency "$f_{12}$" corresponding to the transmission channel is produced at this transmission time slot. Next, the frequency scanning is restarted, and the signal having the frequency "$f_{13}$" used to monitor other channels is generated at the monitor (MON) time slot. When the monitor time slot is ended, the signal having the frequency "$f_{14}$" corresponding to the reception (RX) time slot in the subsequent frame is generated. Such an operation is sequentially repeated.

Figure 5:
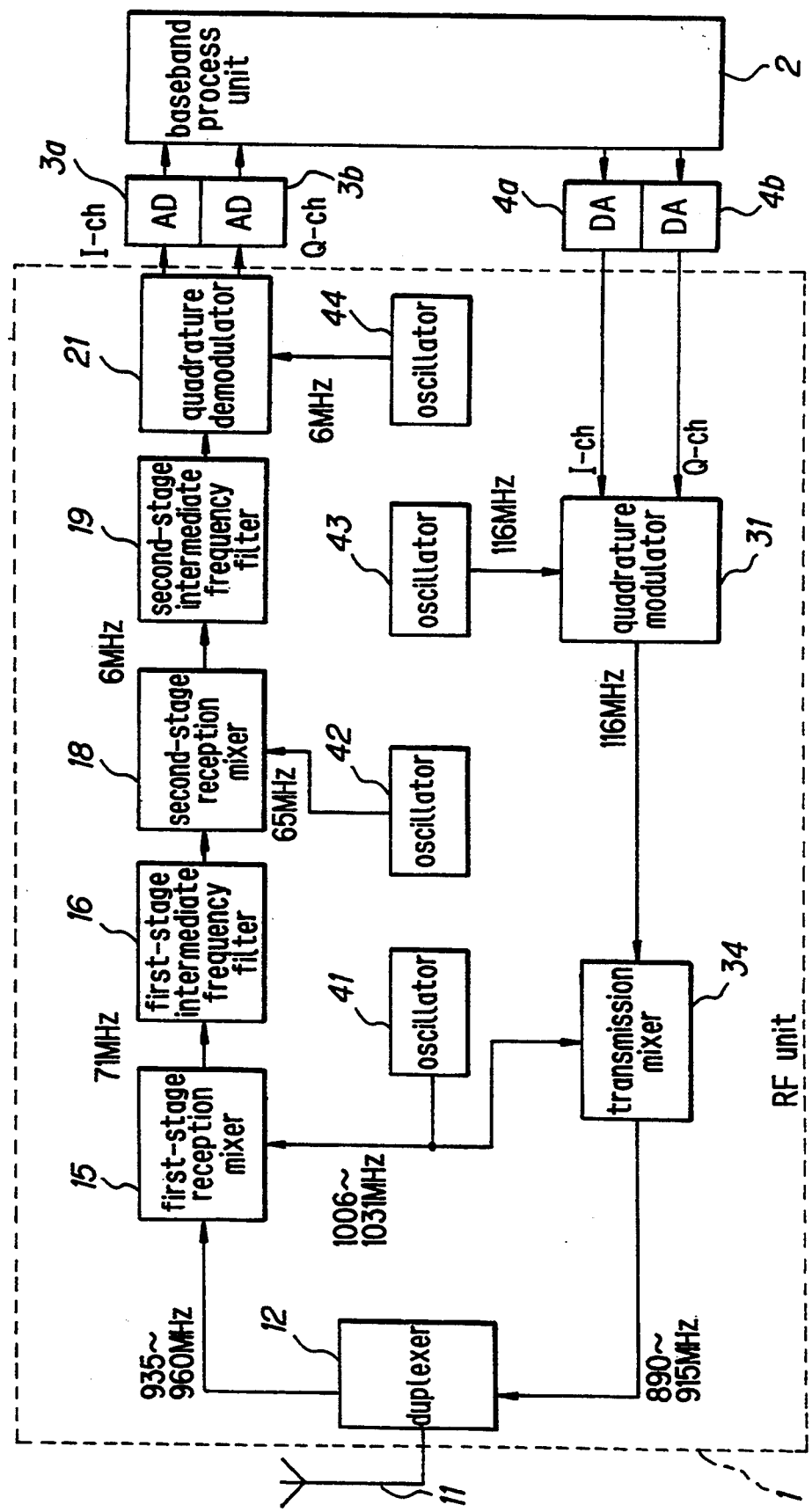
FIG. 5 is an explanatory diagram for describing a relationship among the frequencies at the various circuit portions in FIG. 4.
Figure 6A:
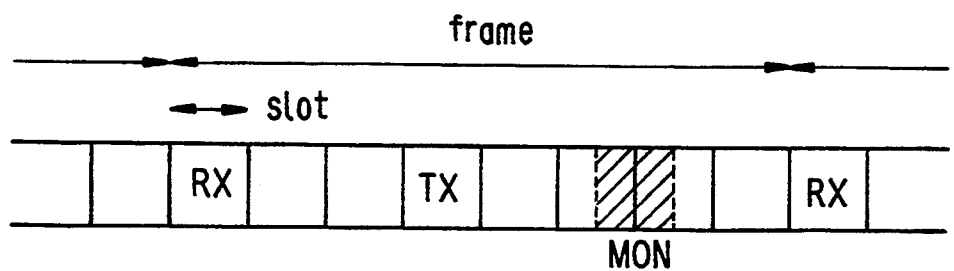
FIG. 6(a) is a timing chart for explaining a relationship between the frames and the time slots of the circuit shown in FIG. 5.
Figure 6B:
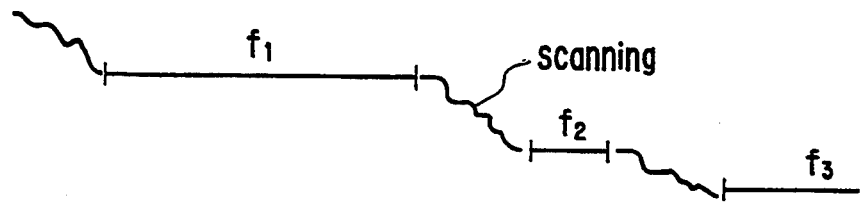
FIG. 6(b) is a timing chart for explaining variations in the oscillating frequencies of the oscillators.

Also, the oscillators 71 and 72 employed in the first embodiment are arranged by a PLL synthesizer. The oscillating frequencies from 221 MHz to 272 MHz of this oscillator 72 are equal to $\frac{1}{4}$ to $\frac{1}{3}$ of the oscillating frequencies from 1,006 MHz to 1,031 MHz of the oscillator 41 shown in FIG. 5, or of the oscillating frequencies from 864 MHz to 915 MHz of the oscillator 41 indicated in FIG. 8.

The loop gain "K" of PLL may be expressed by the following equation:

$$K = K_V \times K_P / N$$

Here, symbol "$K_V$" indicates a gain of a voltage controlled oscillator (VCO) for constituting this PLL, symbol "$K_P$" denotes a gain of a phase comparator for constituting the PLL, and symbol "N" denotes a frequency dividing ratio of a frequency divider contained in the PLL.

In other words, since the loop gain "K" is in inverse proportion to the frequency dividing ratio "N", such a fact that the oscillating frequencies may be divided into $\frac{1}{4}$ to $\frac{1}{3}$ of the conventional oscillating frequencies implies that the loop gain "K" of the PLL may be increased 3 to 4 times higher than the conventional loop gain.

Figure 8:
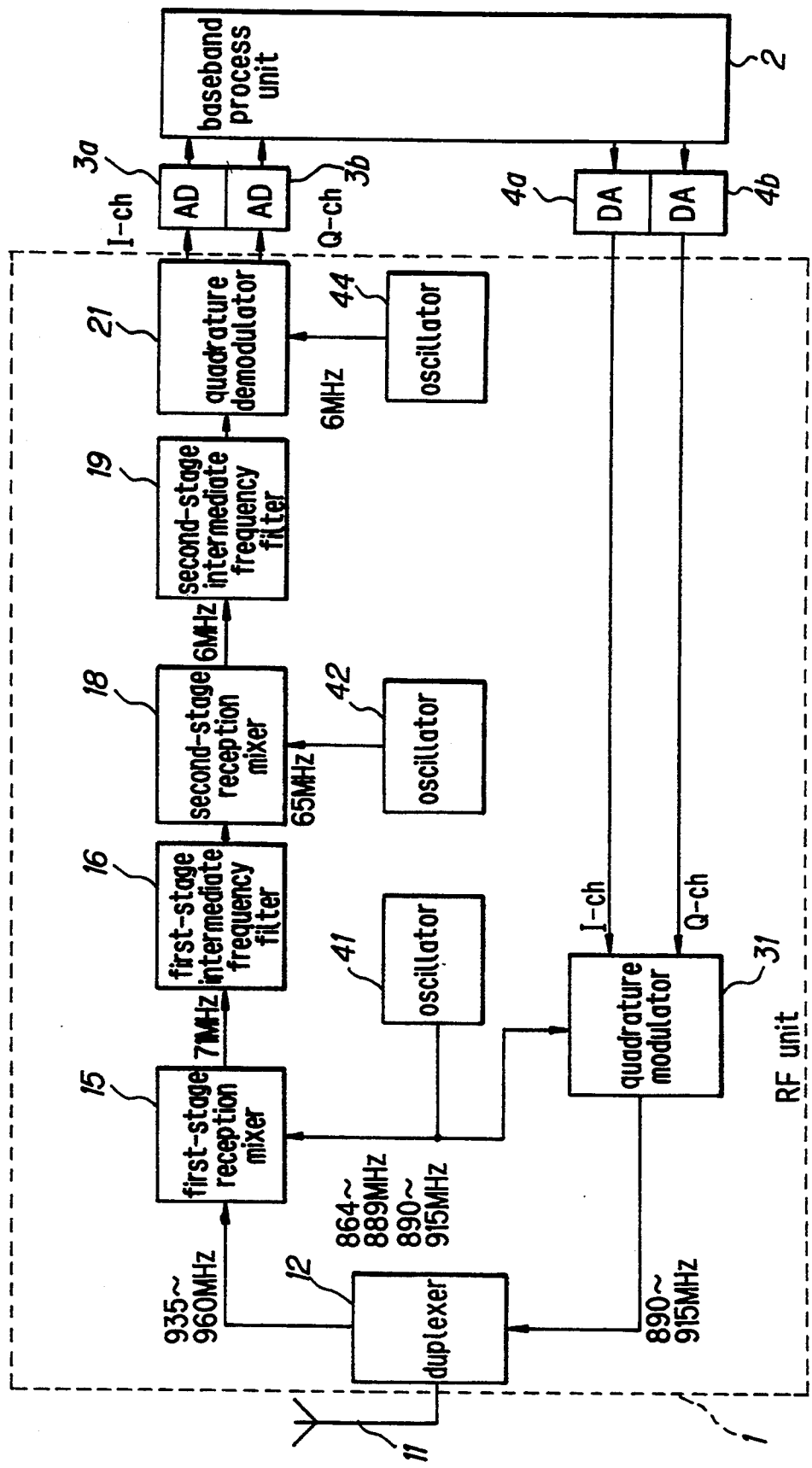
FIG. 8 is a schematic block diagram for showing another arrangement of the terminal unit functioning as a base of the present invention.

Assuming now that the channel interval, i.e., 200 KHz of the GSM is the phase comparing frequency, when the oscillating frequency of the oscillator 41 is 1,031 MHz, in case of FIG. 8, the frequency dividing ratio N is given as follows: N=1,031/0.2=5,155. When the oscillating frequency of the oscillator 72 is 221 MHz, in case of this embodiment shown in FIG. 11, the frequency dividing ratio N is given as follows: N=221/0.2=1,105. As a result, the frequency dividing ratio N may be lowered and the loop gain of the PLL may be increased in accordance with the first embodiment.

When the loop gain may be set to such a large value, the time constant of the PLL may be decreased and a highspeed scanning operation is realized. As a result of experience, the carrier purity during the locking state of the PLL could become better. In other words, it could be confirmed to realize a frequency variable PLL synthesizer capable of performing a highspeed scanning operation, sufficiently satisfying the GSM regulation. The locking up time of this PLL is approximately 0.6 ms to 0.7 ms at this time.

In accordance with the first embodiment of the present invention, the signal to be transmitted is directly modulated in the quadrature modulator 31. After the signal produced from the oscillator 72 is mixed with the signal derived from the oscillator 71, the mixed signal is supplied to the quadrature modulator 31, so that the frequencies (890 MHz to 915 MHz) of the signal outputted from the quadrature modulator 31 are different from the frequencies (221 MHz to 272 MHz, or 1,136 MHz), the signal outputted from either the oscillator 72 or the oscillator 71. It is prevented that the oscillating operations of the oscillator 72 or 71 are adversely influenced by the signal derived from the quadrature modulator 31.

Figure 13:
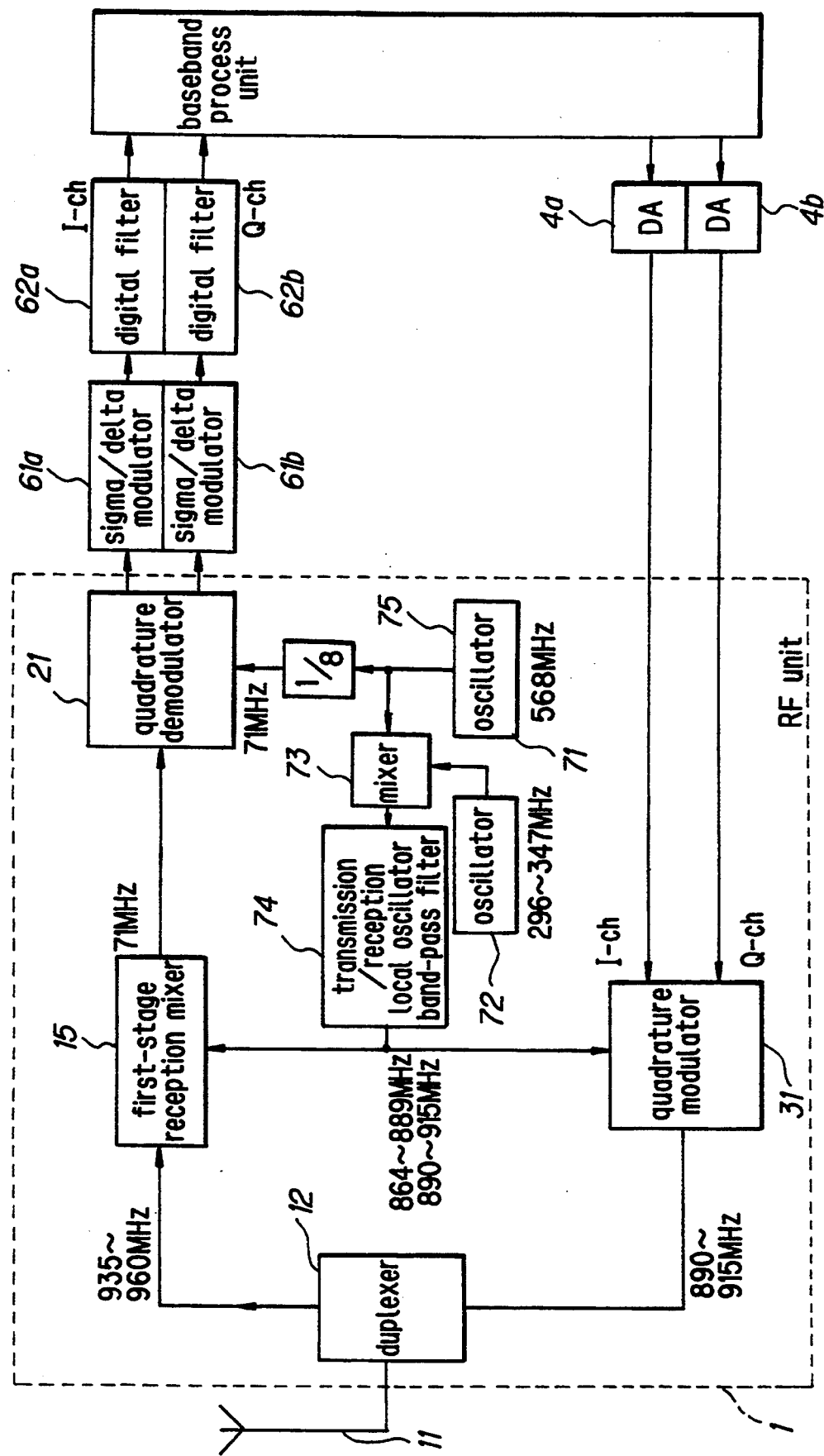
FIG. 13 is a schematic block diagram for showing another arrangement of a time division multiplex transmitting/receiving system according to a second embodiment of the present invention.

FIG. 13 represents an arrangement of a time division multiplex transmitting/receiving system according to a second embodiment of the present invention. In this second embodiment, it is assumed that the oscillating frequency of the oscillator 71 is 568 MHz, and the oscillating frequency of the oscillator 72 is from 296 MHz to 347 MHz. Also in this case, since the signal outputted from the oscillator 72 is mixed with the signal outputted from the oscillator 71 by the mixer 73, signals having frequencies from 864 MHz to 889 MHz at the reception (RX) time slot and signal having frequencies from 890 MHz to 915 MHz at the transmission (TX) time slot can be produced. In this case, since the oscillating frequency of the oscillator 71 is selected to be $\frac{1}{2}$ of the oscillating frequency in the embodiment shown in FIG. 11, the frequency dividing ratio of the frequency dividing circuit 75 becomes $\frac{1}{2}$ of that of the embodiment indicated in FIG. 11.

Figure 14:
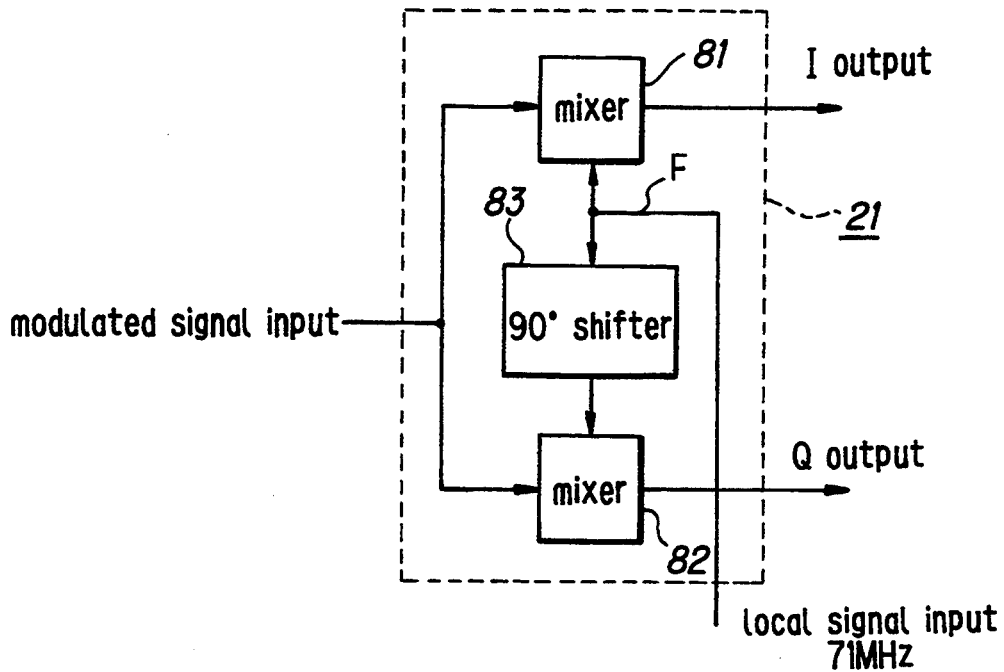
FIG. 14 is a schematic block diagram for indicating an example of an arrangement of the quadrature demodulator 21 employed in the first or second embodiment shown in FIG. 10 or FIG. 13.

When the quadrature demodulator 21 is arranged by an analog circuit in the embodiments of FIG. 11 and FIG. 13, for example, as illustrated in FIG. 14, this analog quadrature demodulator may be constructed by employing mixers 81 and 82, and a 90° phase shifter 83. In this case, the signal having the frequency of 71 MHz supplied by the frequency dividing circuit 75 is furnished to the mixer 81 and then mixed with the modulated signal supplied from the first-stage intermediate frequency AGC amplifier 76, thereby generating an I signal component.

On the other hand, a signal "F" having a frequency 71 MHz supplied from the frequency dividing circuit 75 is phase-shifted by 90° by the 90° phase shifter 83 and the phase-shifted signal is supplied to the mixer 82. Then the phase-shifted signal is mixed with the modulated signal inputted from the first-stage intermediate frequency AGC amplifier 76, thereby producing a Q signal component.

Figure 15:
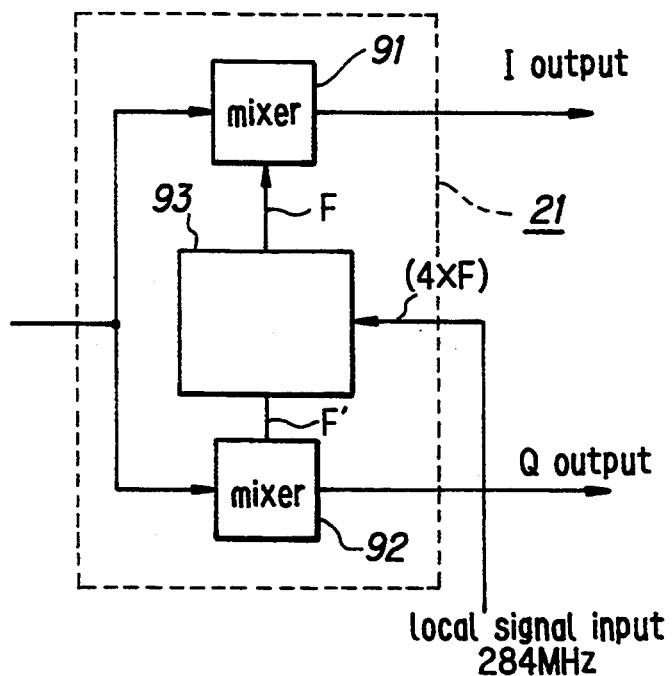
FIG. 15 is a schematic block diagram for representing an example of another arrangement of the quadrature demodulator 21 employed in the first or second embodiment shown in FIG. 10 or FIG. 13.

When the quadrature demodulator 21 of FIG. 11 is arranged by a digital circuit, as shown in FIG. 15, this digital quadrature demodulator may be constituted by mixers 91, 92 and a frequency dividing circuit 93. In this case, a frequency dividing ratio of this frequency dividing circuit 93 is selected to be $\frac{1}{4}$. In other words, a signal "4XF" having a frequency of 284 MHz is inputted into this frequency dividing circuit 93.

Figure 16:
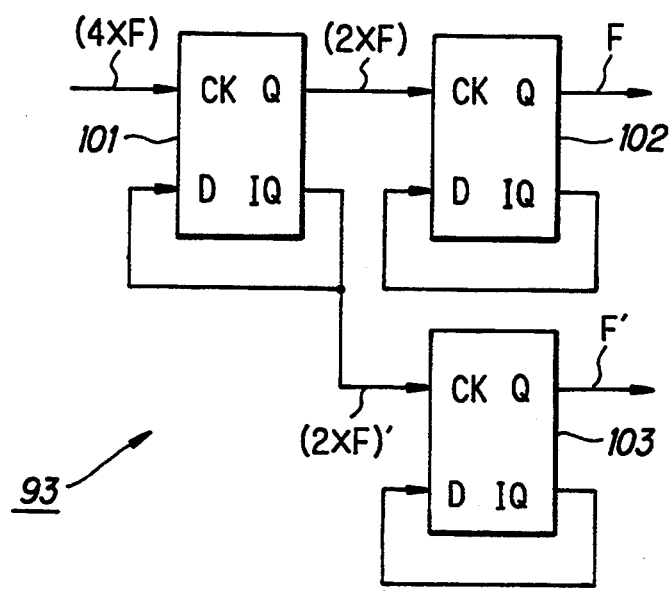
FIG. 16 is a schematic block diagram for indicating an example of a circuit arrangement of the frequency dividing circuit 93 shown in FIG. 15.
Figure 17A:
Figure 17B:

FIG. 16 indicates an example of the arrangement of the frequency dividing circuit 93. As shown in FIG. 16, this frequency dividing circuit 93 is arranged by D type flip-flops 101 to 103. As illustrated in FIG. 17(a), the signal "4XF" having the frequency of 284 MHz supplied from the frequency dividing circuit 75 is supplied to a clock terminal "CK" of the D type flip-flop 101. Since an IQ output having an opposite logic value to that of a Q output of this D type flip-flop 101 is inputted to a D terminal, the Q output of the D type flip-flop 101 delivers a signal having a frequency (2XF=142 MHz) equal to ½ frequency (4/F) entered into the clock terminal CK of the D type flip-flop 101, as shown in FIG. 17(b).

Figure 7:
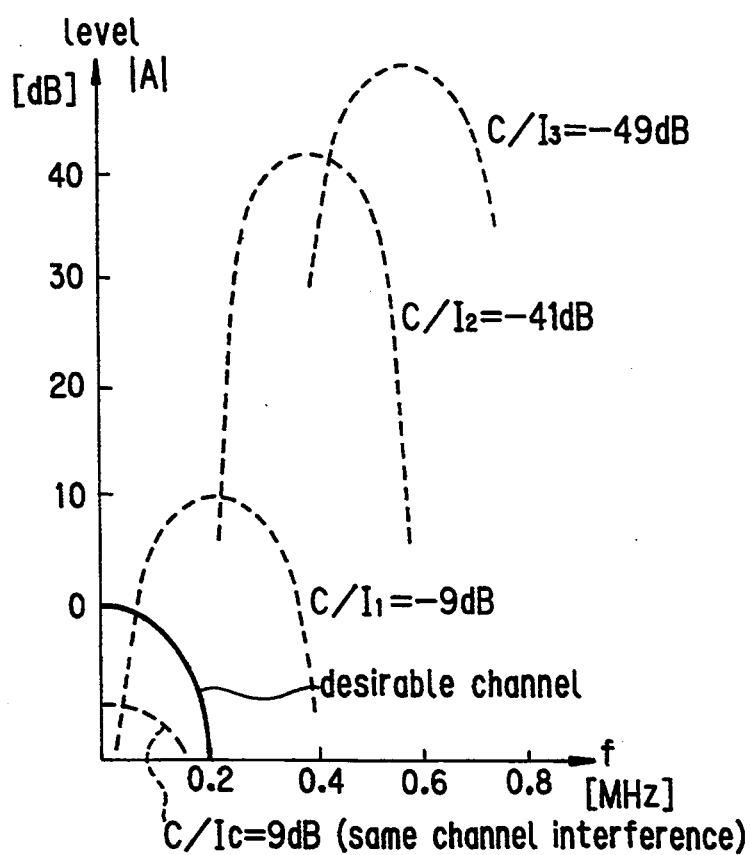
FIG. 7 is an explanatory diagram for explaining levels of the desirable signal and the interference signal.

The signal (2XF) as the Q output of the D type flip-flop 101 is inputted to a clock terminal of a D type flip-flop 102 at the post stage. Since an IQ output having an opposite logic output to the Q output is inputted to this D type flip-flop 102, this Q output becomes a signal having a frequency "F" (71 MHz) equal to ½ frequency of the signal supplied to the clock terminal CK, as shown in FIG. 7(d).

Figure 17C:
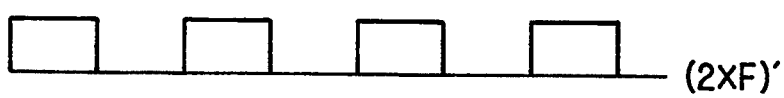

On the other hand, the IQ output of the D type flip-flop 101 is supplied to a clock terminal CK of the D type flip-flop 103. As represented in FIG. 17(c), the IQ output (2XF)' of the D type flip-flop 101 has an opposite logic value to that of the Q output of the D type flip-flop 101, as shown in FIG. 17(b). As a result, since the IQ output of the D type flip-flop 103 is fed back to the D terminal, a signal "F'" (as shown in FIG. 17(e)) having a phase shifted by 90° from the phase of the Q output "F" from the D type flip-flop 102 (as indicated in FIG. 17(d)) may be obtained from the Q output of the D type flip-flop 103.

Figure 17D:
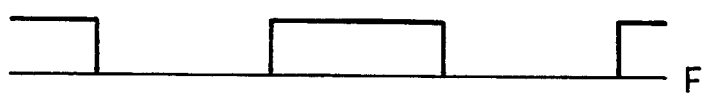
Figure 17E:

The signal "F" as indicated in FIG. 17(d) is inputted into the mixer 91 to be multiplied with the modulated signal, so that the I signal component is demodulated. Also, the signal "F" is inputted into the mixer 92 to be multiplied with the modulated signal, so that the Q signal component is demodulated.

Since this frequency dividing circuit 93 is so arranged as to merely locically perform the phase shift operation, there the merits that occurrences of phase errors become small with respect to the variations in the frequencies and no adjustment is required and also fluctuation in the characteristic is small, as compared with such a case that the 90° phase shift is realized by way of the analog circuitry in ¼ frequency dividing ratio.

In other words, according to the first and second embodiments, since the frequency of the oscillator output derived from the oscillator 71 functioning as the frequency fixed PLL synthesizer is equal to 4 N times higher than the frequency (71 MHz) of the necessary local signal, the phase shift operation may be readily realized in the local method with employment of this local signal having the 4 N times frequency (284 MHz).

It should be noted that when the quadrature demodulator 21 shown in FIG. 13 would be constructed as indicated in FIG. 15, since the oscillating frequency of the oscillator 71 is 568 MHz, the frequency dividing ratio of the frequency dividing circuit 75 is selected to be ⅛.

In the time division multiplex transmitting/receiving system according to the present invention, after the reception signal is once converted into the intermediate frequency signal during the signal reception, the intermediate frequency signal is demodulated by the demodulator, whereas during the signal transmission, the signal to be transmitted is directly modulated by the quadrature modulator, so that the total number of oscillators can be reduced.

While the time division multiplex transmitting/receiving system of the present invention has been applied to the digital automobile telephone system, i.e., GSM in Europe in the above description, it could be appreciated that the present invention is not limited to such an European GSM system, but also may be applied to other time division multiplex type transmitters/receivers.

What is claimed is:

1. A time division multiplex transmitting/receiving system for converting a signal to be transmitted into a signal having a predetermined frequency in a predetermined time slot and transmitting said converted signal with said predetermined frequency as a transmission signal, and also for receiving another signal having another frequency different from said frequency of the transmission signal in another time slot different from said predetermined time slot and demodulating said received signal, said transmitting/receiving system comprising:
   fixed oscillating means for outputting a first signal having a constant frequency;
   variable oscillating means for outputting a second signal having a predetermined frequency within a preselected frequency range;
   mixing means for mixing said first signal with said second signal;
   modulating means for directly modulating said signal to be transmitted using said mixed signal of said mixing means;
   converting means for converting said received signal into an intermediate frequency signal using said mixed signal of said mixing means;
   frequency dividing means for frequency-dividing said first signal; and
   demodulating means for demodulating said intermediate frequency signal by utilizing said frequency-divided first signal.

2. A time division multiplex transmitting/receiving system as claimed in claim 1, wherein said variable oscillating means changes the frequency of said second signal for every time slot.

3. A time division multiplex transmitting/receiving system as claimed in claim 1, further comprising:
   a sigma/delta modulator for modulating said demodulated intermediate frequency signal from said demodulating means; and
   a digital filter for limiting a pass-band of said output signal derived from said sigma/delta modulator.

4. A time division multiplex transmitting/receiving system for converting a signal to be transmitted into a signal having a predetermined frequency in a predetermined time slot and transmitting said converted signal with said predetermined frequency as a transmission signal, and also for receiving another signal having another frequency different from said frequency of the transmission signal in another time slot different from said predetermined time slot and demodulating said received signal, said transmitting/receiving system comprising:
   a single antenna;
   an RF (radio frequency) unit connected to said single antenna, said RF unit including: an oscillator mixing means for outputting a signal produced by mixing a first signal having a constant frequency with a second signal having a predetermined frequency coincident with a transmission channel and a reception channel within a predetermined frequency band; a modulating means for directly modulating said signal to be transmitted based on said mixed signal derived from said oscillator mixing means; a converting means for converting said received signal into an intermediate frequency signal using said mixed signal; a dividing means for producing a frequency divided signal by frequency dividing said first signal; and a demodulating means for demodulating said intermediate frequency signal based upon said frequency divided signal;

A/D converting means for A/D-converting a demodulated signal outputted from said demodulating means;

a signal processing unit for converting an output signal derived from said A/D converting means into a voice signal, thereby outputting said voice signal, and for converting an inputted voice signal into said signal to be transmitted;

D/A converting means for D/A-converting said signal to be transmitted derived from said signal processing unit and to output the D/A-converted signal to said modulating means.

5. A time division multiplex transmitting/receiving system as claimed in claim 4, wherein said oscillator mixing means includes:

a first oscillator for producing said first signal;

a second oscillator for producing said second signal; and a mixing means for mixing said first signal from said first oscillator with said second signal from said second oscillator.

6. A time division multiplex transmitting/receiving system as claimed in claim 5, wherein said second oscillator changes the frequency of said second signal for every time slot.

7. A time division multiplex transmitting/receiving system as claimed in claim 5, wherein the frequency of said first oscillator is higher than the frequency of said second oscillator.

8. A time division multiplex transmitting/receiving system as claimed in claim 5, wherein said mixing means includes:

a mixer for mixing said first signal with said second signal; and a filter for extracting a frequency component corresponding to said received signal from the signal outputted from said mixer during the signal reception, and for extracting a frequency component corresponding to the transmission signal during the signal transmission.

9. A time division multiplex transmitting/receiving system as claimed in claim 8, wherein said filter extracts only a frequency component of a signal lower by 71 MHz than said received signal from the signal outputted from said mixer during the signal reception.

10. A time division multiplex transmitting/receiving system as claimed in claim 8, wherein said oscillator mixing means further includes a frequency dividing means for frequency-dividing said first signal.

11. A time division multiplex transmitting/receiving system as claimed in claim 10, wherein the frequency of said frequency-divided signal is identical to the frequency of said intermediate frequency signal.

12. A time division multiplex transmitting/receiving system as claimed in claim 4, wherein said A/D converting means is constructed of a sigma/delta modulator for modulating the output from said demodulating means, and a digital filter for decimating the output signal derived from said sigma/delta modulator.

* * * * *